United States Patent Office 2,865,819
Patented Dec. 23, 1958

2,865,819

PURIFICATION OF NEOPENTYLGLYCOL BY AZEOTROPIC DISTILLATION

Hugh J. Hagemeyer, Jr., and Sam H. Johnson, Jr., Longview, Tex., assignors to Eastman Kodak Company, Rochester, N. Y., a corporation of New Jersey No Drawing. Application June 25, 1956
Serial No. 593,322

6 Claims. (Cl. 202—42)

This invention relates to a novel process for the purification of neopentylglycol. In a more specific aspect, this invention relates to a novel process for separating neopentylglycol from by-product salts, such as sodium hydroxypivalate and sodium formate, formed in the process of preparing the neopentylglycol.

Neopentylglycol (2,2-dimethyl propane-1,3-diol or pentaglycol), a white crystalline solid (M. P. 130–131° C.) is formed by the condensation of isobutyraldehyde with formaldehyde and subsequent reduction of the intermediate product. Hydroxypivaldehyde is formed as an intermediate, and it is reduced either catalytically or with additional formaldehyde in the presence of sodium hydroxide to the desired diol. The hydroxypivaldehyde which is formed as an intermediate in the process is a highly reactive compound and it has a tendency to form an ester by a Tischenko reaction. When catalytic hydrogenation is employed to reduce the intermediate aldehyde to the desired diol, the crude neopentylglycol is contaminated with as much as 10 to 15% of the neopentylglycol ester of hydroxypivalic acid. This ester is not stable when the crude reaction mixture is distilled and for maximum recovery of neopentylglycol, the crude reaction product is saponified with caustic. Distillation in the presence of sodium salts of hydroxypivalic acid and other organic acids in the reaction mixture results in considerable decomposition of the neopentylglycol and an impure product.

Various means have been suggested for the purification of crude neopentylglycol. For example, extraction with a solvent medium containing a low boiling ketone, such as acetone, has been suggested as a purification procedure. Direct separation of the neopentylglycol from the crude reaction product by vacuum distillation results in a product having a melting point considerably lower than pure neopentylglycol indicating that the product is relatively impure, and with such a procedure yields of neopentylglycol in the neighborhood of 70% of theoretical have been obtained. Obviously, such procedures are uneconomical and the desirability and necessity of using improved procedures for recovery of neopentylglycol from the crude reaction product are quite obvious.

In accordance with this invention, it has been found that a substantially pure neopentylglycol can be recovered from its crude reaction mixture without decomposition of reaction byproducts by azeotroping the neopentylglycol away from the crude reaction mixture in the presence of a suitable azeotroping agent for the neopentylglycol. The azeotroping agent in addition to removing the neopentylglycol maintains the by-product reaction salts in a slurry which prevents charring and decomposition of those salts.

The azeotroping agents that can be used in the practice of this invention are organic compounds having boiling points within the range of 150 to 300° C. at atmospheric pressure. The compounds that are suitable for the process form constant boiling mixtures or azeotropes with neopentylglycol and for the practice of this invention, the azeotropic mixture should contain neopentylglycol in an amount within the range of 10 to 60% by weight at either atmospheric pressure or a subatmospheric pressure depending upon the actual pressure to be used in the process. The process is operated at a maximum base temperature of 150° C. at either atmospheric or subatmospheric pressure. The pressure is determined by the temperature that is necessary to avoid decomposition of the neopentylglycol in the crude reaction mixture to be resolved.

Suitable azeotroping agents for use in this process are unsaturated aliphatic hydrocarbons and aromatic hydrocarbons having a boiling point within the range of 150 to 300° C. For example, the dodecene isomers or a polypropylene fraction consisting of all $C_9$ mono-olefins, para-cymene, ortho, meta and para diethylbenzene and tetralin (tetrahydronaphthylene) can be used in the process. Additionally, the $C_5$ to $C_{12}$ saturated aliphatic alcohols having boiling points within the range of 150 to 300° C. at atmospheric pressure can be used in the process. Further, mono- and di-esters of diacids and diols having boiling points within the range of 150 to 300° C. such as diethyl succinate, isobutylbenzoate, di-n-butyl adipate, can be used in the process. Additionally, benzene derivatives such as acetophenone, nitrobenzene and diphenyl ether have been found to be suitable azeotroping agents for use in the practice of this invention.

The crude reaction mixture containing the neopentylglycol which is to be recovered by the practice of this invention can be prepared by a procedure involving the reaction of isobutyraldehyde and formaldehyde at about 60° C. in the presence of potassium carbonate. The resulting hydroxypivaldehyde is reduced with hydrogen in the presence of Raney nickel at 140 to 150° C. and 1000 p. s. i. Alternatively, the hydroxypivaldehyde can be reduced with excess formaldehyde. The crude reaction mixture containing the neopentylglycol as obtained from the reaction autoclave is saponified with caustic to remove any ester present. Then the crude neopentylglycol or aqueous solution thereof is fed to the process of this invention wherein the neopentylglycol is removed from the crude reaction mixture with an azeotroping agent.

The details of the process will be described by using tetralin as the preferred azeotroping agent. However, it will be realized that any of the above-mentioned organic azeotroping agents can be employed in the process. The crude reaction mixture containing the neopentylglycol or an aqueous solution thereof is fed to a drying column along with the tetralin. In the drying column, an azeotrope of water and tetralin is removed overhead to produce a substantially anhydrous mixture of neopentylglycol, tetralin and by-product reaction salts. This latter mixture is then removed to a suitable distillation column which is operated at a base temperature not in excess of 150° C. and a pressure not above atmospheric and preferably subatmospheric. The overhead from this column contains the azeotrope of tetralin and neopentylglycol with its composition depending upon the actual temperature and pressure for distillation. The overhead from this distillation column can be treated in any suitable manner, such as by washing with water, to separate the neopentylglycol from tetralin. The resulting aqueous solution of neopentylglycol can then be dried in any suitable manner to produce a pure, dry neopentylglycol.

In the practice of this invention, an amount of azeotroping agent, such as tetralin, is employed to remove substantially all the neopentylglycol from the crude reaction mixture. A further amount of tetralin has been found to be desirable to remove the water from the crude reaction mixture as a step preliminary to the recovery of the neopentylglycol. Also, an additional amount of tetralin can be used to maintain the by-product reaction salts in a slurry during the azeotropic distillation step.

EXAMPLE 1

*Purification of neopentylglycol by comparative procedures*

Neopentylglycol is a high-melting, white, crystalline solid having a tendency to sublime at its melting point. Pure neopentylglycol melts sharply at 130 to 131° C. A batch of crude neopentylglycol was prepared in accordance with the procedure described above by reacting isobutyraldehyde with formaldehyde and catalytically reducing the hydroxypivaldehyde with hydrogen to form a crude neopentylglycol containing 12.5% ester and 87.5% neopentylglycol on a dry-weight basis.

In the first separation procedure, the crude mixture containing neopentylglycol was distilled in a 30-plate bubble cap column, with a 3:1 reflux ratio and at 60 mm. pressure. The neopentylglycol recovery was 70% of theoretical and the product had a melting point of 110 to 116° C. and contained 1.55% ester.

In a second separation procedure, another portion of the above neopentylglycol was saponified with 10% excess sodium hydroxide and distilled at reduced pressure. The recovery of neopentylglycol was 66% of theoretical and the product had a melting point of 118 to 120° C. and an ester content of 0.45%.

In a third separation procedure, another portion of the above crude neopentylglycol was saponified with 10% excess sodium hydroxide. Tetralin was added as an azeotroping agent and the water present in the crude product was removed by distillation with an azeotrope of tetralin and water being taken overhead. After removal of the water, the resulting mixture containing tetralin and neopentylglycol was distilled at 138° C. and 100 mm. pressure to take overhead an azeotropic mixture containing tetralin and neopentylglycol, the latter being present as 29.8 weight percent of the azeotrope. The neopentylglycol was separated from the tetralin by washing with water and the resulting aqueous solution of neopentylglycol was distilled to dryness. The resulting neopentylglycol melted sharply at 129 to 130° C. and contained 0.06% ester. The glycol recovery was 96.9% of theoretical.

From a comparison of the above three procedures for recovering neopentylglycol from a crude reaction product, it is readily apparent that the procedure of this invention produces not only a highly purified neopentylglycol, but also greatly increases the recovery of neopentylglycol.

In Table I are reported various azeotropes of 2,2-dimethyl-1,3-propanediol with organic compounds. The boiling point of pure 2,2-dimethyl-1,3-propanediol is 208° C. at atmospheric. Once purified the diol is very stable to atmospheric distillation.

TABLE I

| Compound and Boiling Point, ° C. | B. P., ° C. of Azeotrope | | Percent Diol in Azeotrope | |
|---|---|---|---|---|
| | Atmos. Press. | Reduced Press. | Atmos. Press. | Reduced Press. |
| dodecene, 195 | 180 | 115 @ 105 mm | 21.2 | 14.2 |
| diethylsuccinate, 218 | 205 | 146 @ 105 mm | 59.0 | 53.5 |
| para-cymene, 176 | 170 | 106 @ 100 mm | 16.8 | 8.3 |
| diethylbenzene, 183 | 177 | 112-113 @ 98 mm | 18.8 | 11.2 |
| n-decanol, 231 | 204 | 149 @ 100 mm | 68.6 | 65.9 |
| acetophenone, 202 | 197 | 133 @ 95 mm | 27.0 | 14.3 |
| nitrobenzene, 211 | 198 | 134 @ 95 mm | 47.0 | 28.8 |
| di-n-butyladipate, 183/14 | | 148 @ 105 mm | | 93.5 |
| tetralin, 207 | | 139 @ 100 mm | | 29.8 |
| diphenyl ether, 245 | | 140 @ 55 mm | | 64.0 |
| isobutylbenzoate, 242 | | 138 @ 76 mm | | 40.0 |

EXAMPLE 2

*Continuous separation of neopentylglycol using a tetralin azeotrope*

A 1000-pounds-per-day pilot plant for the separation of neopentylglycol was operated as follows. The autoclave discharge contained 25-35 percent neopentylglycol, 2-6 percent ester (equiv. wt.=204) and 0.1-2.0 percent hydroxypivaldehyde in water. This mixture was saponified with 20 percent sodium hydroxide and then fed to a drying column with tetralin. Water was azeotroped off and the neopentylglycol-salt-tetralin mixture was pumped from the base of the drying column to the glycol-tetralin azeotrope column operating at reduced pressure. The overhead from the vacuum column was washed continuously with an equal volume of water and fed to a decanter. The organic or tetralin layer was returned to the drying column and water-glycol layer was fed to a stripping column. Pure, dry neopentylglycol was pumped from the base of the stripping column and fed to a flaker.

In an alternate method of operation the neopentylglycol was taken off as a vapor from the base of stripper, condensed and fed to the flaker.

Operating in the above manner, the recovery of neopentylglycol averages 90–98 percent of the theoretical with a minimum purity of 98.5 percent, M. P. 126–131° C., color APHA<100 (50 percent solution in acetone).

We claim:

1. In a process for producing neopentylglycol wherein isobutyraldehyde is reacted with formaldehyde and resulting hydroxypivaldehyde is reduced to neopentylglycol, the improvement for recovering neopentylglycol from the crude product of the aforementioned reactions which comprises distilling crude reaction product containing neopentylglycol in the presence of an azeotroping agent for said neopentylglycol, said azeotroping agent having a boiling point at atmospheric pressure within the range of 150 to 300° C. and forming an azeotrope with neopentylglycol having a boiling point not above 150° C. and containing from 10% to 60% by weight of neopentylglycol at a pressure not above atmospheric and said agent being selected from the group consisting of unsaturated aliphatic hydrocarbons and aromatic hydrocarbons having the aforementioned properties, $C_6$–$C_{12}$ saturated aliphatic alcohols, mono- and di-esters of diacids and diols having the aforementioned properties, acetophenone, nitrobenzene and diphenyl ether.

2. In a process for producing neopentylglycol wherein isobutyraldehyde is reacted with formaldehyde and resulting hydroxypivaldehyde is reduced to neopentylglycol, the improvement for recovering neopentylglycol from the crude product of the aforementioned reactions which comprises distilling crude reaction product containing neopentylglycol in the presence of tetralin to take an azeotropic mixture of neopentylglycol and tetralin overhead.

3. In a process for producing neopentylglycol wherein isobutyraldehyde is reacted with formaldehyde and resulting hydroxypivaldehyde is reduced to neopentylglycol, the improvement for recovering neopentylglycol from the crude product of the aforementioned reactions which comprises distilling crude reaction product containing neopentylglycol in the presence of tetralin at a temperature not above 150° C. and a pressure not above atmospheric to take an azeotropic mixture of neopentylglycol and tetralin overhead.

4. The process for recovering neopentylglycol from a mixture containing neopentylglycol, water, sodium hydroxypivalate and sodium formate, which comprises adding tetralin to said mixture and distilling resulting mixture to take overhead an azeotrope of water and tetralin and to produce a substantially anhydrous mixture of tetralin, neopentylglycol, sodium hydroxypivalate and sodium formate, distilling said anhydrous mixture to take overhead an azeotrope of tetralin and neopentylglycol and to produce a slurry of tetralin, sodium hydroxypivalate and sodium formate.

5. A process according to claim 4 wherein the distillation of the anhydrous mixture is effected at a temperature not above 150° C. and a pressure not above atmospheric.

6. A process according to claim 4 wherein the azeotrope of tetralin and neopentylglycol is washed with water and resulting aqueous solution of neopentylglycol is dried to produce a substantially pure, dried neopentylglycol.

References Cited in the file of this patent

UNITED STATES PATENTS

| 2,135,063 | Walker et al. | Nov. 1, 1938 |
| 2,407,920 | Cox | Sept. 17, 1946 |
| 2,420,496 | Poitras et al. | May 13, 1947 |
| 2,422,802 | Schelling et al. | June 24, 1947 |

FOREIGN PATENTS

| 730,759 | Great Britain | May 25, 1955 |